US007774217B1

(12) United States Patent
Yager et al.

(10) Patent No.: US 7,774,217 B1
(45) Date of Patent: Aug. 10, 2010

(54) SYSTEMS AND METHODS FOR CUSTOMIZING AUTOMOBILE INSURANCE

(75) Inventors: Floyd M. Yager, Park Ridge, IL (US); Thomas J. Wilson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 454 days.

(21) Appl. No.: 11/551,595

(22) Filed: Oct. 20, 2006

Related U.S. Application Data (63) Continuation-in-part of application No. 11/270,611, filed on Nov. 10, 2005, now abandoned.

(60) Provisional application No. 60/629,318, filed on Nov. 19, 2004.

(51) Int. Cl.
 *G06Q 40/00* (2006.01)
(52) U.S. Cl. ......................................................... 705/4
(58) Field of Classification Search ....................... 705/4
 See application file for complete search history.

(56) References Cited

U.S. PATENT DOCUMENTS

| | | | |
|---|---|---|---|
| 4,567,359 A | 1/1986 | Lockwood | |
| 4,667,336 A | 5/1987 | Best | |
| 4,843,578 A | 6/1989 | Wade | |
| 5,191,522 A | 3/1993 | Bosco et al. | |
| 5,359,528 A | 10/1994 | Haendel et al. | |
| 5,430,432 A | 7/1995 | Camhi et al. | |
| 5,483,442 A | 1/1996 | Black et al. | |
| 5,499,182 A | 3/1996 | Ousborne | |
| 5,550,551 A | 8/1996 | Alesio | |
| 5,638,273 A | 6/1997 | Coiner et al. | |
| 5,752,236 A | 5/1998 | Sexton et al. | |
| 5,797,134 A | 8/1998 | McMillan et al. | |
| 5,864,305 A | 1/1999 | Rosenquist | |
| 5,873,066 A | 2/1999 | Underwood et al. | |
| 5,877,707 A | 3/1999 | Kowalick | |
| 5,950,169 A | 9/1999 | Borghesi et al. | |
| 6,026,364 A | 2/2000 | Whitworth | |
| 6,064,970 A | 5/2000 | McMillan et al. | |
| 6,092,047 A | 7/2000 | Hyman et al. | |

(Continued)

FOREIGN PATENT DOCUMENTS

CA 2235566 2/1998

(Continued)

OTHER PUBLICATIONS

Anonymous, How Forgiving Is Your Auto Insurance?, Nov. 1984, Changing Times, 38, 011, p. 42-44.*

(Continued)

*Primary Examiner*—Robert W Morgan
*Assistant Examiner*—Joy Chng
(74) *Attorney, Agent, or Firm*—Banner & Witcoff, Ltd.

(57) ABSTRACT

Systems and methods provide customizable insurance according to consumer preferences. Demand simulators may be used to guide the creation of optimized packages of features, which consumers may select from to form an insurance product appropriate for their particular needs. Packages may be formed with a particular appeal to consumers with common characteristics. In addition, methods are provided for selling insurance products formed through an optimization process and providing corresponding insurance services.

11 Claims, 9 Drawing Sheets

U.S. PATENT DOCUMENTS

| | | |
|---|---|---|
| 6,185,540 B1 | 2/2001 | Schreitmueller et al. |
| 6,502,020 B2 | 12/2002 | Lang |
| 6,735,569 B1 | 5/2004 | Wizig |
| 6,795,759 B2 | 9/2004 | Doyle |
| 6,868,386 B1 | 3/2005 | Henderson et al. |
| 6,925,441 B1 | 8/2005 | Jones et al. |
| 6,978,249 B1 | 12/2005 | Beyer et al. |
| 6,980,098 B2 | 12/2005 | Shinada et al. |
| 7,035,935 B1 | 4/2006 | Voois et al. |
| 7,188,070 B2 | 3/2007 | Dar et al. |
| 7,346,525 B1 | 3/2008 | Milanovich |
| 2001/0044733 A1 | 11/2001 | Lee et al. |
| 2002/0002475 A1 | 1/2002 | Freedman et al. |
| 2002/0004730 A1 | 1/2002 | Yoshioka et al. |
| 2002/0007289 A1 | 1/2002 | Malin et al. |
| 2002/0010598 A1 | 1/2002 | Johnson et al. |
| 2002/0010599 A1* | 1/2002 | Levison .................. 705/4 |
| 2002/0013754 A1 | 1/2002 | Frank et al. |
| 2002/0035488 A1 | 3/2002 | Aquila et al. |
| 2002/0049617 A1 | 4/2002 | Lencki et al. |
| 2002/0095316 A1 | 7/2002 | Toan et al. |
| 2002/0103677 A1 | 8/2002 | Sexton et al. |
| 2002/0103678 A1 | 8/2002 | Burkhalter et al. |
| 2002/0111725 A1 | 8/2002 | Burge |
| 2002/0128882 A1 | 9/2002 | Nakagawa et al. |
| 2002/0152115 A1 | 10/2002 | Morita et al. |
| 2002/0178033 A1 | 11/2002 | Yoshioka et al. |
| 2002/0188480 A1 | 12/2002 | Liebeskind et al. |
| 2003/0171959 A1 | 9/2003 | Galloway |
| 2003/0187702 A1 | 10/2003 | Bonissone et al. |
| 2003/0187704 A1 | 10/2003 | Hashiguchi et al. |
| 2004/0024619 A1 | 2/2004 | DiBella |
| 2004/0039503 A1 | 2/2004 | Doyle |
| 2004/0117217 A1 | 6/2004 | Reber et al. |
| 2004/0133542 A1 | 7/2004 | Doerksen et al. |
| 2004/0153362 A1* | 8/2004 | Bauer et al. .................. 705/10 |
| 2004/0260579 A1 | 12/2004 | Tremiti |
| 2005/0108064 A1 | 5/2005 | Castleman et al. |
| 2006/0041454 A1 | 2/2006 | Matisonn et al. |
| 2006/0053038 A1 | 3/2006 | Warren et al. |
| 2006/0059020 A1 | 3/2006 | Davidson |
| 2006/0074724 A1 | 4/2006 | Schwartz et al. |
| 2006/0143053 A1 | 6/2006 | Van Rensburg |
| 2006/0155587 A1 | 7/2006 | Sparrow |
| 2006/0253307 A1 | 11/2006 | Warren et al. |
| 2007/0027726 A1 | 2/2007 | Warren et al. |
| 2007/0100668 A1 | 5/2007 | Webb |
| 2007/0118411 A1 | 5/2007 | Conner et al. |
| 2007/0136109 A1 | 6/2007 | Yager et al. |

FOREIGN PATENT DOCUMENTS

| | | |
|---|---|---|
| CA | 2321459 | 4/2001 |
| CA | 2321459 A1 | 4/2001 |
| EP | 1050853 | 11/2000 |
| EP | 1313043 | 5/2003 |
| EP | 1557779 | 7/2005 |
| EP | 1557780 | 7/2005 |
| EP | 1746537 | 1/2007 |
| EP | 1160707 | 2/2009 |
| FR | 2801262 | 5/2001 |
| GB | 2143978 | 2/1985 |
| JP | 4182868 | 6/1992 |
| JP | 02117237 | 4/2002 |
| JP | 02149984 | 5/2002 |
| JP | 02203108 | 7/2002 |
| JP | 168006 | 6/2006 |
| JP | 0341537 | 12/2006 |
| JP | 257602 | 10/2007 |
| KR | 02045186 | 6/2002 |
| KR | 020075327 | 10/2002 |
| KR | 02091629 | 12/2002 |
| KR | 03043196 | 6/2003 |
| WO | 9727561 | 1/1997 |
| WO | 0139090 | 5/2001 |
| WO | 01084427 | 11/2001 |
| WO | 0203163 | 1/2002 |
| WO | 0215090 | 2/2002 |
| WO | 02079919 | 10/2002 |
| WO | 02086422 | 10/2002 |
| WO | 02088889 | 11/2002 |
| WO | 02088889 A2 | 11/2002 |
| WO | 2004015535 | 2/2004 |
| WO | 2004044696 | 5/2004 |
| WO | 2008016350 | 2/2008 |
| WO | 2008054722 | 5/2008 |

OTHER PUBLICATIONS

Johannes Mehring; Premium Rates in The German Motor Insurance Business; The Austin Bulletin; vol. III, Part 1, Dec. 1963; Dusseldorf, West Germany; pp. 13-19.

Joseph J. Muir—"Principles and Practices in Connection with Classification Rating Systems for Liability Insurance as Applied to Private Passenger Automobiles"; Proceedings of the Casualty Actuarial Society; May 23, 1957 and Nov. 21, 1957; pp. 19-44; vol. XLIV.

Stephen S. Makgill; Panel Discussion—May 1963 Meeting; "An Analysis of the Adequacy of the Various Factors and Rating Values Used in Retrospective Eating"; pp. 32-49; ; Proceedings of the Casualty Actuarial Society; May 1963, Oct. 1963; pp. 32-49; vol. L.

Massachusetts Safe Driver Insurance Plan [on-line]. Retrieved from the Internet: http://www.mass.gov/Eoca/docs/doi/Legal_Hearings/211_134.PDF.

Allstate Choice Auto Insurance. [on-line] [attached copy retrieved on Feb. 6, 2009]. Retrieved from the internet: http://www.allstate.com/auto-insurance/auto-insurance-features.aspx.

Good Driver Car Insurance Rewards Safe Driving. [on-line], [attached copy retrieved on Feb. 6, 2009]. Retrieved from internet:http://www.insureme.com/content/rsrc/auto/good-driver-car-insurance.

Take Advantage Auto Insurance Discounts, Dec. 8, 2008 [on-line], [attached copy retrieved on Apr. 20, 2009]. Retrieved from internet: http://www.insurance.com/quotes/article.aspx/Take_Advantage_Auto_Insurance_Discounts/artid/160.

"New Price Quotes for Massachusetts Drivers Now Available From Liberty Mutual" Feb. 18, 2008; Liberty Mutual New Releases; [on-line], [attached copy retrieved on Jun. 4, 2008]. Retrieved from the internet: http://www.libertymutual.com/omapps/ContentServer?cid=1003349317278&prid=11383550083.

Ajit Chaudhari. Safe-T-Net Traffic Safety Design Chaudhari, et al. Oct. 20, 1997. [on-line], [attached copy retrieved on Dec. 7, 2007]. Retrieved from the internet: http:captology.stanford.edu/resources/designs/project2/safetnet.html.

Advocating Mileage-Based Auto Insurance (Spring 2002). [on-line], [attached copy retrieved on Jan. 22, 2009]. Retrieved from the internet: http://www.clf.org/general/index.asp?.id=49.

Charoen Kitti Kanya; Customers Hold All the Aces;—Bangkokpost 1999 Economic Review. [on-line], [attached copy retrieved on Dec. 7, 2007]. Retrieved from the Internet: http://www.bangkokpost.com/99year-end/16insurance.htm.

Drowsy Driver Deterent Project—Nov. 2, 1998, The Association for Automobile Safety and Accident Prevention. [attached copy retrieved on Dec. 7, 2007]. Retrieved from the internet: http://cmgm.standford.edu~pbrutlag/portfolio/ddd/index.html.

Low No Claims Bonus, [on-line], [attached copy retrieved on Dec. 7, 2007]. Retrieved from the internet: http://www.bell.co.uk/about_us.php.

Ian Ayres, Make Car Insurance Fairer; and Barry Nalebuff; Mar. 17, 2003; vol. 171: Issue 06; Forbes Magazine—Copyright 2003 Forbes, Inc.

Ben Jacklet; Pay as you drive' policies get boost; Portland Tribune Jan. 10, 2003; [on-line], [attached copy retrieved on Dec. 7, 2007]. Retrieved from Internet: http://www.portlanddtribune.com/news/story.php?story_id=15889.

Rewarding Safe Drivers; Apr. 25, 2002—News Release [on-line], [Attached copy retrieved on Dec. 7, 2007]. Retrieved from the internet: http://www.sgi.sk.ca/news_releases/2002/apr_25_2002.htm.

Road Safety Council Bill 2001; Apr. 11, 2002 [on-line] Attached copy retrieved from the Internet: http://www.parliament.wa.gov.au/hansard/hans35.nsf(ATT)/B3CFBB73FDE9421BC825733F002600FC/$file/C36+S1+20020411+p9427d-943la.pdf.

The Safest Cars of 91, Published Date Dec. 3, 1990, edition U.S. News and World Report; Edward Baig.

Martin Rosenberg, Rate Classification Reform in New Jersey,1992), [on-line], [attach copy retrieved on Feb. 6, 2009]. Retrieved from the Internet http://www.faqs.org/abstracts/Insurance/London-Rate-classification-reform-in-New-Jersey.

YCA Sensation Reignites Excitement Around Allstate Your Choice Auto. Nov. 6, 2007 [On-line], [attached copy retrieved on Nov. 11, 2007] Retrieved from the Internet: http://cr/allstateenow/allstate/2007-11-06-YCA.htm.

Responsible Driver Guarantee, [On-line], [attached copy retrieved on Jun. 4, 2008], Retrieved from the Internet: File://D:\np/responsibledriver.htm.

Car Insurance Rates and Accidents; copyright 1995-2008 [on-line], [attached copy retrieved on May 23, 2008]. Retreived from the Internet: http://auto.progressive.com/progressive-car-insurance/accident-forgiveness.aspx.

Allstate Corporation; Rules Manual; Implementation Dates: Aug. 28, 1989 and Nov. 16, 1992; pp. 11-16; Wisconsin Department of Insurance; Wisconsin, USA.

Allstate Corporation; Rules Manual; Implementation Date: Dec. 13, 2004; pp. 58-1-58-4; Wisconsin Department of Insurance; Wisconsin, USA.

Allstate Corporation; Rules Manual; Implementation Dates: Aug. 11, 1997 and Jun. 7, 1999 ; pp. 36-40; Maine Department of Insurance; Maine, USA.

Allstate Corporation; Rules Manual; Implementation Date: Dec. 6, 2004; p. 55-1; Oregon Department of Insurance; Oregon, USA.

Allstate Corporation; Rules Manual; Implementation Date: Dec. 6, 2004; pp. 54-1-54-2; Oregon Department of Insurance; Oregon, USA.

Allstate Corporation; Rules Manual; Implementation Date: Dec. 6, 2004; pp. 22-1-22-10; Oregon Department of Insurance; Oregon, USA.

Allstate Corporation; Rules Manual; Implementation Date: Feb. 26, 2001; p. HO26-1; Mississippi Department of Insurance; Mississippi, USA.

Allstate Corporation; Rules Manual; Implementation Date: Jul. 31, 2000; pp. H023-1-HO23-2; Missouri Department of Insurance; Missouri, USA.

Allstate Corporation; Rules Manual; Implementation Date: Mar. 6, 2006; p. HOPC26-1; Idaho Department of Insurance; Idaho, USA.

Allstate Corporation; Rules Manual; Implementation Date: Nov. 3, 2003; p. HOPC26-1; Colorado Department of Insurance; Colorado, USA.

Allstate Corporation; Rules Manual; Implementation Date: Jan. 3, 2000; pp. 22-1-22-8; Colorado Department of Insurance; Colorado, USA.

Allstate Corporation; Rules Manual; Implementation Date: Dec. 13, 2004; pp. 59-1-59-2; Wisconsin Department of Insurance; Wisconsin, USA.

Allstate Corporation; Rules Manual; Implementation Date: Oct. 31, 2005; pp. 59-1-59-3; Indiana Department of Insurance; Indiana, USA.

Allstate Corporation; Rules Manual; Implementation Date: Mar. 6, 2006; p. HOPC36-1; Idaho Department of Insurance; Idaho, USA.

Allstate Corporation; Rules Manual; Implementation Date: Mar. 6, 2006; p. HOPC37-1; Idaho Department of Insurance; Idaho, USA.

Anonymous—How Forgiving is your Auto Insurance? Changing Times (pre-1986); Nov. 1984; 38, 011; ABI/INFORM p. 42.

Zinkewica, Paul. Specialty Niche Programs Take on Increasing Importance for Growth-Orientated Agencies. Nov. 1994. Rough Notes. http://findarticles.com/p/articles/mi_qa3615/is_199411/ai_n8709928.

Goldmine Insurance Case Study. 2004. http://www.frontrange.com/common/Files/Downloads/Case_Studies/SMRM_Casestudies/SMRM_GoldMine_CaseStudyRAandRInusance_NA_EN.pdf.

Target Markets News and Information Newsletter. Feb. 2004. http://www.odbcworkz.com/htmlmail/targetmkts/febnews/feb04news.pdf.

Keller, Wolfgang. Some Patterns for Insurance Systems. 1998. http://www.objectarchitects.de/ObjectArchitects/papers/Published/ZippedPapers/inspat03.pdf.

Wikipedia Webpage on Focus Groups. May 8, 2004. http://web.archive.org/web/20040508214920/http://en.wikipedia.org/wiki/Focus_group.

Philadelphia Insurance Companies Webpages. Jan. 23, 2002. http://web.archive.org/web/20020123150654/http://phly.com.

Monroe, Melissa. Auto Insurance Driving Down Costs. Many Policy Holdersignore ways to Reduce Premiums. San Antonio Express News. San Antonio Texas, Jan. 6, 2003. p. 01.L.

Long Term Care Insurance Policy Optional Benefits. Insurance Planners Website. Aug. 12, 2004. http://web.archive.org/web/20040812182952/http://www.long-term-care-insurance-planners.com/optional_benefits.html.

Niche Insurance Companies. Stewart Economics, Inc. 1997. http://www.stewarteconomics.com/Niches.pdf.

Wikipedia Webpage on Focus Groups, May 8, 2004. http://web.archive.org/web/20040508214920/http://en.wikipedia.org/wiki/Focus_group.

Philadelphia Insurance Companies Webpages, Jan. 23, 2002. http://web.archive.org/web/20020123150654/http://phly.com/.

Monroe, Melissa. Auto Insurance Driving Down Costs. Many Policy Holdersignore Ways to Reduce Premiums. San Antonio Express News, San Antonio Texas, Jan. 6, 2003. p. 01.L.

Long Term Care Insurance Policy Optional Benefits. Insurance Planners Website. Aug. 12, 2004. http://web.archive.org/web/20040812182952/http://www.long-term-care-insurance-planners.com/optional_benefits.html.

Zinkewica, Paul. Specialty Niche Programs Take on Increasing Importance for Growth-Orientated Agencies. Nov. 1994. Rough Notes. http://findarticles.com/p/articles/mi_qa3615/is_199411/ai_n8709928/.

Goldmine Insurance Case Study. 2004 http://frontrange.com/common/Files/Downloads/Case_Studies/SMRM_Casestudies/SMRM_Goldmine_CaseStudyRAndRinsurance_NA_EN.pdf.

Target Markets News and Information Newsletter. Feb. 2004. http://www.odbcworkz.com/htmlmail/targetmkts/febnews/feb04news.pdf.

Keller, Wolfgang. Some Patterns for Insurance Systems. 1998 http://www.objectarchitects.de/ObjectArchitects/papers/Published/ZippedPapers/inspat03.pdf.

Niche Insurance Companies. Stewart Economics, Inc. 1997 http://www.stewarteconomics.com/Niches.pdf.

Non-Final Rejection mailed from USPTO Aug. 6, 2006 for U.S. Appl. No. 11/774,442.

Final Rejection mailed from USPTO Dec. 16, 2009 for U.S. Appl. No. 11/774,442.

* cited by examiner

SYSTEMS AND METHODS FOR CUSTOMIZING AUTOMOBILE INSURANCE

The present application is a continuation-in-part of U.S. patent application Ser. No. 11/270,611, filed Nov. 10, 2005 and entitled "Systems and Methods for Customizing Insurance" which claims priority to U.S. Provisional Application No. 60/629,318, filed Nov. 19, 2004. The entire disclosures of which are hereby incorporated by reference.

TECHNICAL FIELD

The present invention relates to systems and methods for customizing insurance and, more particularly, to customizing insurance policies according to consumer preferences. The present invention also provides systems and methods to design insurance products in a manner that allows consumers to select insurance packages that include features they consider appropriate for their needs.

BACKGROUND

Today's consumer is more pressed than ever for time. With increasing time demands placed, many consumers do not have much time to shop, and what time they do have seems to be consumed in reviewing the massive amount of information they encounter in shopping. The pressures attendant the time constraints and information can pervade a consumer's shopping experience, including shopping for insurance.

New technologies, however, now make possible aids to help consumers as they make insurance choices in much less time that they could years ago. The challenge is how to harness those technologies.

SUMMARY

Methods and systems are provided for creating insurance packages and providing insurance services. Insurance packages may be created by performing research to identify a target population and a set of insurance features desired by the target population. The set of insurance features may be bundled into an insurance package. The packages may include standard components, combinations of optimized components, optimized combinations of standard components and various combinations. The insurance packages may provide automobile insurance, homeowner's insurance and other types of insurance In certain embodiments of the invention, aspects of the present invention can be partially or wholly implemented with a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

All descriptions are exemplary and explanatory only and are not intended to restrict the invention, as claimed. The accompanying drawings, which are incorporated in and constitute a part of this specification, illustrate embodiments of the invention and, together with the description, serve to explain the principles of the invention. In the drawings:

DETAILED DESCRIPTION

Generally, insurance is an agreement by which an insurer, sometimes referred to as an underwriter, in exchange for consideration, undertakes to indemnify the insured party against loss, damage, or liability arising from certain risks. The consideration paid by an insured party is typically referred to as a premium, which is paid to keep the insurance in effect. In general, an insurance policy is a contract of insurance that defines the rights and duties of the contracting parties. A typical insurance policy includes limits on the amount of risk that the insurer will cover.

Systems and methods consistent with aspects of the present invention provide consumers with insurance products that may help them address some of their individual needs or wants by including features that a particular group may find desirable or appropriate. For the purposes of this application, features may include coverages, terms, and rewards. Generally, a coverage provides a protection or indemnification to the insured. A term includes any word, phrase, or provision of import that determines the nature and scope of an agreement, such as the coverage grant in an insurance coverage or the premium charged. A reward may include a discount, credit, or benefit provided to the insured upon the occurrence of a specified event.

When a feature is not included in a group, that particular feature is referred to as an ala carte feature. Ala carte features refer to coverages, terms, and rewards that are selected by the insured on an individual basis for inclusion in an insurance product.

Features may be grouped together to form a package. For example, one grouping may form a value package for price conscious consumers, another grouping may form a protection plus package providing additional features, and yet another grouping may form a platinum package including yet more additional features. An insurance product may also include a standard package that includes coverages required by state law, such as bodily injury liability coverage and property damage liability coverage. Coverages in a standard package may also include personal injury protection coverage, medical payment coverage, uninsured motorist coverage, underinsured motorist coverage, collision coverage, and comprehensive coverage.

Most states mandate minimum types and levels of automobile insurance coverage. For example, a state may require liability coverage with mandated minimum coverage limits. Depending upon the particular state, some common coverages may be mandatory or optional. Other coverages, such as collision and comprehensive, may be required by banks or financial institutions as a prerequisite to obtain vehicle financing.

In the marketplace today, an automobile insurance product offering might include standard coverages required by state law and/or financial institutions. A standard package includes coverages and coverage limits that meet minimum state law requirements. A standard package may also include other coverages that are required by financial institutions. Additionally, insurance companies may offer coverages and coverage limits that are not required by state law or by financial institutions. Coverage examples include towing reimbursement and car rental reimbursement.

Automobile insurance consumers find value in optional coverages designed around potential risks uniquely associated with driving and or repairing of vehicles. Some examples include towing and emergency repair coverage. A car rental reimbursement coverage may help pay for the use of a rented vehicle while the insured vehicle is being repaired due to a loss caused by a covered peril. Other personal coverages are also offered in the event certain covered perils occur.

The following provides a summary of an exemplary basic optimized package, two additional optimized packages, and various exemplary ala carte features that may be added by a consumer to one of the optimized packages. For example, a basic package might include a reduced premium by adding in a few terms. It is designed as an alternative for the customer particularly concerned about price. In particular, a customer may be required to participate in an arrangement that automatically makes periodic (for example, monthly) deductions from the insured's savings or checking account to pay the premium and other charges or fees associated with the insurance. Customers will be charged an early termination fee (such as $100) if the insurance is terminated by the insured, which might include the insured's failure to accept a renewal offer, or terminated for non-payment of premium, within a specified period of time after the package is added.

Another optimized package might offer an accident waiver enhancement feature and a safe driving deductible reward feature. The accident waiver enhancement feature might specify that the first rate-affecting accident that occurs will not cause the loss of certain discounts or result in the application of any accident surcharges. Subsequent rate affecting accidents will not cause the loss of the discounts or the application of any accident surcharges if the insured has not received this waiver in the thirty-six month experience period ending on the date of the accident. Similarly, a ticket forgiveness feature might specify that a ticket for a traffic violation will not cause the loss of certain discounts or result in a policy not being renewed.

The safe driving deductible reward feature might provide, upon enrollment, that the customer will receive an initial reduction (such as $100) in his or her collision deductible. For each twelve month experience period the policy is not assigned an accident, the insured will receive an additional reduction (up to a maximum $500 reduction) in their collision deductible that will apply to all covered collision claims during the next policy period.

Yet another optimized package might offer an accident waiver enhancement plus feature, a safe driving deductible reward feature, and a safe driving bonus feature. With the accident waiver enhancement plus feature, neither a single accident nor multiple accidents will cause the loss of certain discounts or the application of accident surcharges as long as the accidents occur while this feature is part of the policy. The safe driving bonus feature may provide if the policy is not assigned an accident for a designated six-month experience period, the insured will receive 5% of their previous term's premium for major coverages as a credit that can be applied toward the next six-month premium.

Both of the above-described exemplary optimized packages may also allow the customer the opportunity to add, for an additional premium, an additional feature in the form of a new car expanded protection coverage feature on an automobile that has collision and comprehensive coverages. The coverage provided by this feature will continue while collision and comprehensive coverages are maintained and will be removed at the first renewal that is effective in the calendar year that is three years greater than the auto's model year.

The new car expanded protection coverage feature may provide that, in the event of a covered loss to an automobile other than a total loss, the insurance carrier will pay to repair the auto without a deduction for depreciation. The repair coverage may not apply to losses caused by fire, theft, larceny, or flood. Furthermore, the amount payable will be reduced by any amounts paid or payable under the collision or comprehensive coverages as well as any applicable collision or comprehensive deductible.

The new car expanded protection coverage feature may also provide that, in the event of a covered total loss, the insurance carrier will pay to replace the automobile with a new one of the same make and model with the same equipment or, if a new automobile of the same make and model with the same equipment is not available, a new automobile that is similar in size, class, body type and equipment (subject to a price limitation described in the coverage). The replacement coverage may not apply to leased vehicles or to losses caused by fire, theft, larceny, or flood. Furthermore, the amount payable will be reduced by any amounts paid or payable under the collision or comprehensive coverages, any applicable collision or comprehensive deductible, and the dollar amount of any unrepaired damage that occurred prior to the total loss of the automobile.

The new car expanded protection coverage feature may also provide that, in the event of a covered total loss, if the amount the customer owes under the original automobile loan or automobile lease exceeds the actual cash value of the automobile at the time of loss, the insurance carrier will pay the difference between the amounts. The amount payable may be reduced by any overdue loan or lease payments (and any financial penalties associated with those overdue payments), the transfer or rollover of a previous outstanding loan or lease balance from another vehicle to the original loan or lease for the covered automobile, the dollar amount of unrepaired damage which occurred prior to the total loss, all refunds paid or payable to the customer as a result of the early termination of the automobile loan or automobile lease agreement (including financed warranty/extended service contracts), and any amount paid or payable under the replacement protection of the new car expanded coverage protection feature.

In forming the above exemplary packages that are offered for sale by an insurance carrier, one forming the package offerings might decide to consider consumer "need states" to group features into packages offered for sale. Need states refer to the complex web of rational and subconscious triggers that prompt a consumer to make a product selection. Need states may be prompted by a consumer deciding that he or she needs or wants to obtain a product. Furthermore, they are generally a result of an individual's situation at a particular point in time. Life stage events, such as a new driver in the family, shift consumers' need states. Of course, automobile insurance consumers may have varied circumstances, and consequently, differing insurance needs and wants. One may be a student with limited resources, and as a result, might select state mandated coverage. Another may be near retirement and focused on protection of assets and convenience of services.

Systems and methods consistent with aspects of the present invention identify distinct groupings of insurance consumers with similar need states and identify the most commonly desired optional features that consumers might chose to help meet their needs. Optional features are then combined by the system into optimized packages of insurance products that are offered for sale to consumers. By grouping features into packages that align with common need states, the offered products will be attractive to persons in need states that were considered when designing the packages.

An "optimized package" includes a set of insurance features that are packaged to help address the needs and wants of consumers in a particular grouping. Ala carte features may also be optimized. For example, ala carte features may be optimized by grouping certain ala carte features together that share an attribute. Accordingly, both optimized features and optimized ala carte features include coverages, terms, and rewards that are selected from a group that shares an attribute. The shared attribute allows the features to be grouped around a common theme. For example, a value grouping may include features designed around lower price. A protection theme may include features optimized around protecting assets. For the most part, features are grouped to share an attribute, however, features that are grouped around a common theme may also include one or more features that do not share the common theme or are based on a regional theme.

More than one package may be grouped together to form a "plan." A plan refers to a grouping of a standard package with at least one optimized package of features. A consumer may also add ala carte features, or optimized ala carte features, to a plan on an individual basis.

The process by which packages are designed may involve consideration of market theories. When looking to a market, one needs to identify the individuals that might decide to purchase a product. A group of persons that may be interested in or share a need for a particular product or products is defined as a target population. Accordingly, the target population is the group to be reached through some action or intervention and may refer to groups with specific characteristics.

Market segmentation refers to the process of grouping persons in a target population into smaller subgroups called market segments. A market segment is a group within a heterogeneous market consisting of consumers or organizations with relatively homogeneous needs and wants. Consumers in a market segment are expected to respond to a given set of marketing stimuli in a similar manner. Ideally, individuals within a market segment will likely have similar feelings about a marketing mix comprised of a given product, sold at a given price, distributed in a certain way, and promoted in a certain way. Accordingly, a market segment is a more specifically defined group within the target population.

A target population or a market segment may share one or more common characteristics that statistically describe the persons within the target population or market segment. Characteristics may include gender, age, occupation, marital status, and family size.

To select features that might appeal to a particular target population or market segment, features may be grouped together along marketing demand parameters. Groups of features are offered in different product structures, which are discussed in further detail below. Utility-based groupings maximize product acceptance of product packages by statistically predicting consumer demand based on multidimensional analysis of consumer motivations. These motivations are then compiled through a demand simulator to identify and target product requirements that may be attractive to various segments of the consumer population. A demand simulator measures overall demand potential as well as consumer preferences for various product features and brands. By using a demand simulator, it is possible to identify the features that consumers might want most, and then measure the price they are willing to pay for them. Demand simulators are discussed more fully below.

For example, certain features have more universal consumer appeal while other features appeal to a specific consumer characteristic. An optimization process creates focused sets of features. The process may organize product packages around central motivation factors, such as price points and common feature acceptance. Using feature interest as a motivating factor, the most popular features can be grouped to form a set of features that are both universally popular and provide an acceptable profit to an insurance carrier.

Differentiation is introduced by adding features to packages that specifically address the motivations of a specific consumer group. For example, some consumer groups are interested in security features, while others may have young drivers in the household. Because some consumers are highly driven by features while others are driven by price, package structures may be optimized based on price to motivate a consumer segment. Alternatively, package structures may be optimized based on features that appeal to less price-sensitive members of the consumer population. In addition, some optimized package structures may be based upon both price and feature considerations.

Insurance products generated according to the present invention may be offered for sale in a variety of manners. For example, consistent with the present invention, optimized packages may be offered through any form of visual display, either electronically or by the use of brochures, posters, signs, standing displays, and any other form of visual and/or written communication. In addition, one may offer optimized packages through an insurance carrier's agents in person, over the telephone, or via the Internet. In an Internet implementation, or over the telephone using a voice recognition system, such interactions may occur automatically.

Reference will now be made in detail to exemplary embodiments of the invention, examples of which are illustrated in the accompanying drawings. Wherever possible, the same reference numbers will be used throughout the drawings to refer to the same or like parts.

Figure 1:
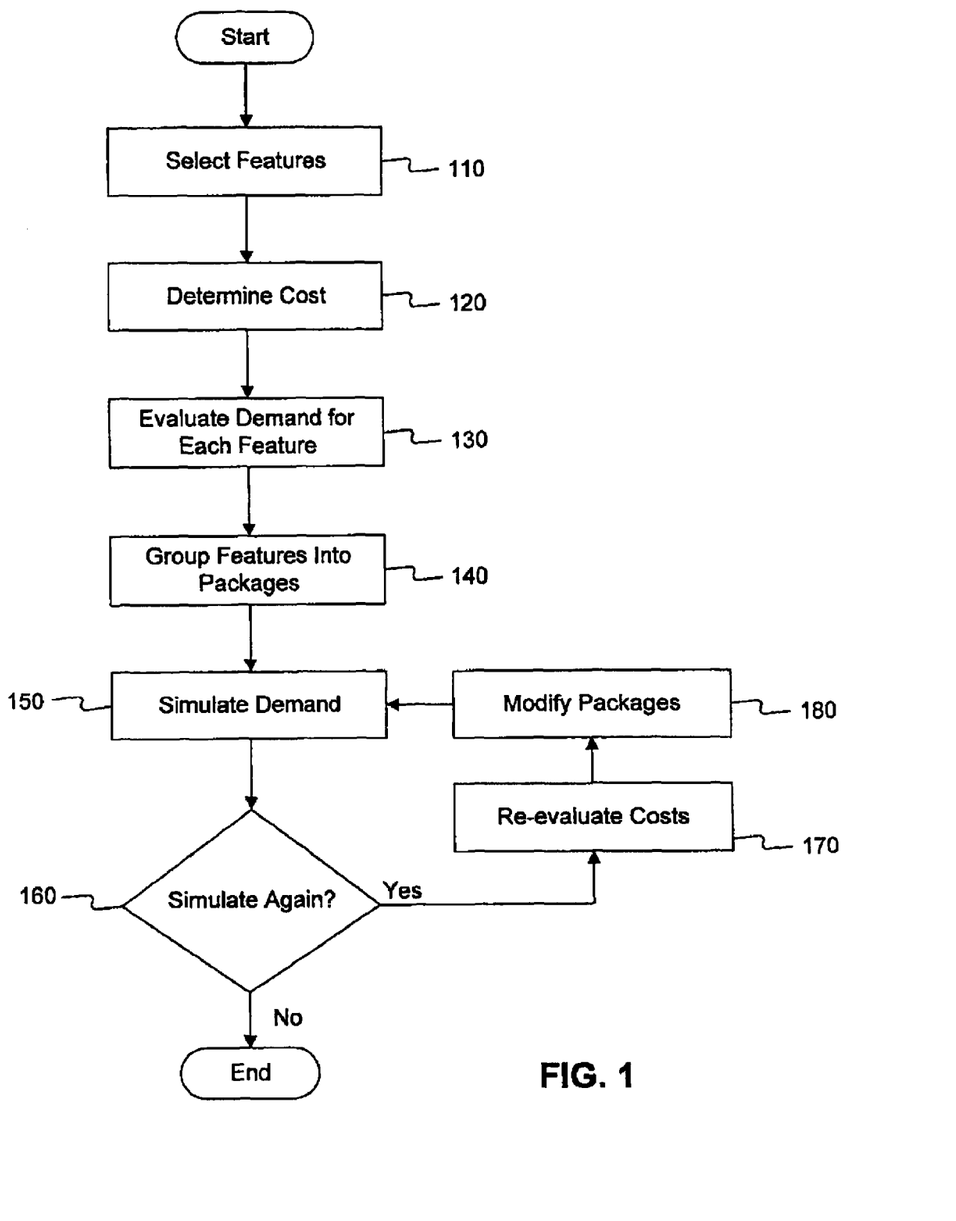
FIG. 1 is an exemplary flow chart for optimizing insurance products, in accordance with an embodiment of the invention.

FIG. 1 is a flow chart for optimizing customizable insurance products, in accordance with an embodiment of the invention. One may optimize insurance products by designing packages using a process that takes into account the considerations discussed in further detail below.

First, features are identified as candidates to be offered as part of various packages, which together form an insurance product. Step 110. To identify those features that one might consider as candidates, business performance data may be analyzed. Business performance data may include different subsets of data obtained by collecting existing information from the marketplace to analyze for trends and to understand the landscape of available options. A possible subset of business performance data is market-share data, which includes industry data used to evaluate current levels of market share for particular consumers to determine demand generated by specific product offerings. In this step of the process, one might identify a target population and/or a market segment.

Other categories of data considered in this step include industry-product-offering data and internal-pricing data. Industry-product-offering data includes an evaluation of the products and features offered in policies from various insurance carriers. In addition, this data may be supplemented by internal pricing data proprietary to the insurance carrier conducting the demand simulation.

Internal-pricing data may include the insurance carrier's premiums, loss, and expense data so that the cost of features can be taken into account. Internal-pricing data allows one to compare a specific insurance carrier's ability to provide a product to consumers at a price consumers are willing to pay. Other ways of arriving at candidate features include brainstorming with experts, examining the current and past marketplace, and by soliciting and receiving suggestions and input from consumers and agents.

Next, the cost of each candidate feature is determined. Step 120. In determining costs of the candidate features, the losses that are expected for a particular feature are examined when determining the premium that consumers will pay.

Once candidate features and costs are determined, the demand for each feature in the marketplace is evaluated. Step 130. During the evaluation, consumer preferences are evaluated to form price utility curves, which are created after conducting consumer research to better understand consumer preferences for each feature or combination of features.

The process of evaluating demand may include collecting information using focus groups selected from different geographic regions. For example, persons participating in focus groups can be selected across all age groups that have actively shopped for insurance during an appropriate time frame. Selection of groups may occur on the basis of any identified target population and/or market segment. During this step, features may be eliminated from further consideration based upon the focus groups' preferences. In addition, focus groups may provide survey information identifying the price each individual was willing to pay for certain features. Such considerations may involve an evaluation of sample packages containing different combinations of features offered at different prices.

Next, features may be grouped into possible packages. Step 140. During this step, cost prohibitive features may be eliminated from packages because consumers may not be willing to pay the price of a particular feature. Also, strategic alternatives data may be examined, including price-point data and variable-feature-level data. Price point data includes an evaluation of a particular insurance carrier's current prices to competitors' prices and includes an evaluation of the impact of adding packaged features. Variable feature level data may be considered to describe the most compelling packages of features. Variable feature level data is derived from consumer research and includes uniqueness and differentiation of features to evaluate the best features and how features should be grouped in packages.

In addition, incremental costs of strategic alternatives data includes variable-feature-cost data and fixed-cost-investments data. Variable-feature-cost data describes an insurance carrier's proprietary loss and expense data and is used to determine a cost to offer a given feature. Fixed-cost investments data takes into account systems, infrastructure, and other costs associated with implementation of an optimized product architecture.

When designing packages, another concept that may be incorporated into the process is that of self-selection. For example, packages should include features that appeal to consumers in a particular need state such that these consumers will recognize the value of a particular package and consider including it in their insurance selections.

Next, demand is simulated using a demand simulator. Step 150. The demand simulator estimates the number of individuals that will purchase a particular product offering. Optimization of packages is accomplished by iteratively trying all possible package combinations or by determining which features may be substituted for other features in the most optimal packages to arrive at a set of features that provides an arrangement of features that a consumer would find of value.

The demand simulator may be implemented as a software module, which processes data provided to it. During the operation of the demand simulator, user input may provide the ability to select different features and to alter inputs to the module. Consistent with the present invention, processing may also occur automatically at the direction of optimization software including automated logic.

Features that are used by the demand simulator may be selected with utility-based product segmentation. As discussed above, price-utility curve data may be used to determine packages. A utility value for each feature may be determined through consumer research to identify the features most attractive to the overall target population as well as to subsets of the target population that form market segments. Features are then grouped into packages, and groups of packages form an insurance product.

After the demand simulator provides an initial processing of features, a user may decide whether to simulate demand again. Step 160. If the user decides to stop, the process ends. If the user decides to continue, the process goes to Step 170. In Step 170, processing may be further refined by re-examining costs of packages by examining different feature combinations based on particular judgment criteria. For example, if the cost of offering a particular package is high, it may be identified using variable-feature-cost data and fixed-cost investment data, as described above in connection with Step 120.

After inspecting the costs, certain features may be removed or added to packages. Step 180. User input may further provide the ability to select different features and to alter inputs to the module. The process then returns to simulate demand for the newly modified packages. Step 150.

Figure 2:
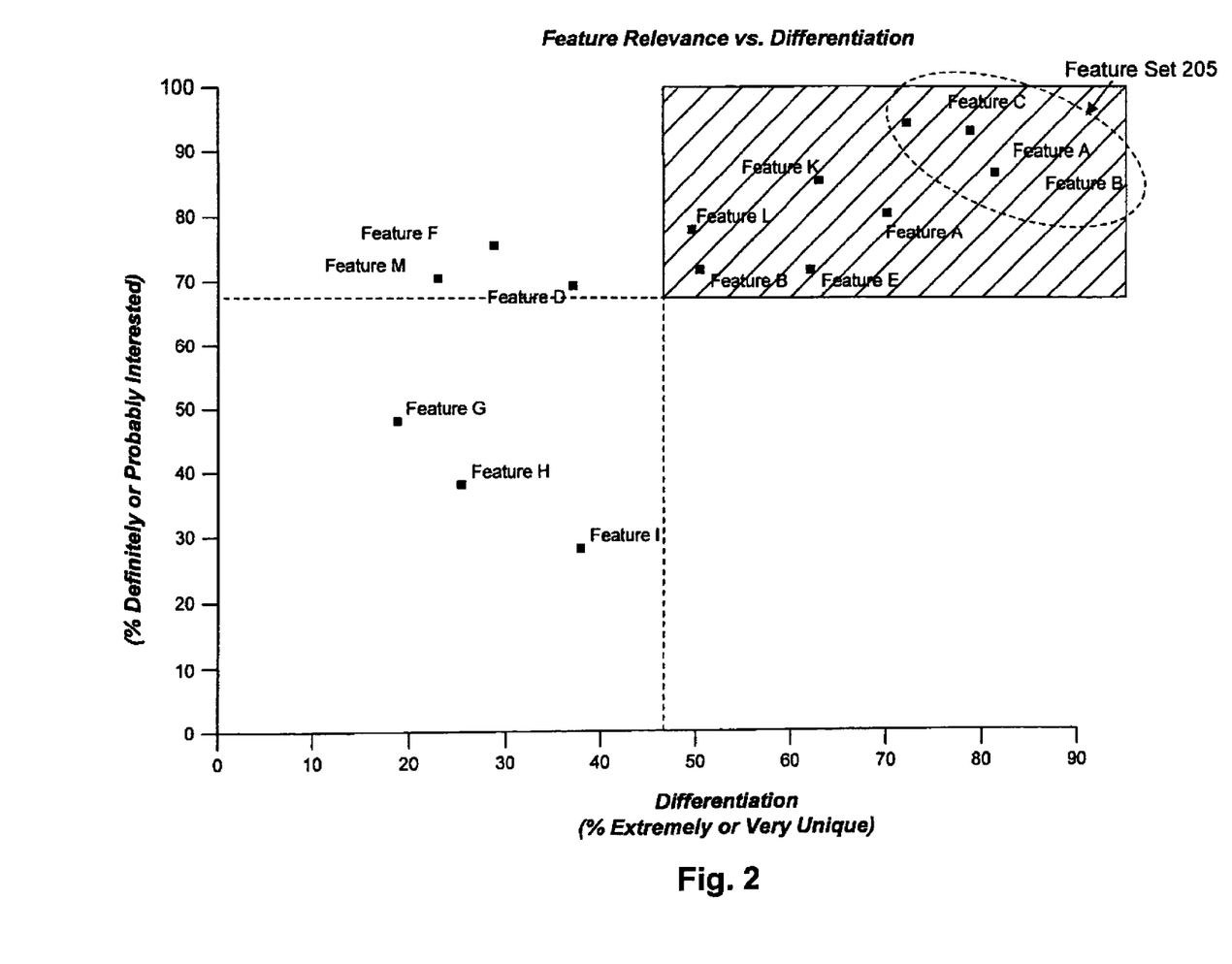
FIG. 2 is an exemplary chart comparing feature relevance and feature differentiation, in accordance with an embodiment of the invention.

FIG. 2 shows an exemplary chart comparing feature relevance and feature differentiation used to perform analysis used in optimizing features for packages. By plotting the data as shown in FIG. 2, it is possible to determine a feature set 205 that includes features that are highly relevant and distinctive. Such a process may be done for an entire population to arrive at feature set 205 and may also be done for sub-segments based on characteristics common to the sub-segments to determine the packages that most appeal to a particular group or subgroup.

Accordingly, research may be performed to identify a target population and a set of insurance features desired by the target population. The set of insurance features are bundled into an insurance package. A cost of the insurance package may be determined and the insurance package may be offered for sale.

Furthermore, the research to identify the insurance features may be carried out through an optimization process, as described above. In some embodiments, the optimization process is based upon consumer factors. In other embodiments, the optimization process is based also upon financial criteria that provide the insurance company with an acceptable profit. The research may also include examining common characteristics of the target population or of a market segment within the target population.

This procedure may be repeated for additional market segments. A set of ala carte features may also be identified and a cost for each of the ala carte features may also be identified, along with determining corresponding prices for the ala carte features and offering the ala carte features for sale at the corresponding prices.

In one embodiment of the invention, an optimized package includes a basic set of insurance features and may be offered for sale along with the insurance package. A standard package may include a set of insurance features required by a governing law. Alternatively, a standard package may also include a set of insurance features required by a financial institution.

For example, an optimized package may additionally include a set of insurance features created by performing research to identify a target population or a market segment. Alternatively, a standard package may also be combined with the optimized package to form a plan. Sets of additional insurance features may also be selected to form additional packages. Each plan may include a standard package and an optimized package.

In addition, a third party may sell optimized packages without a standard package. Such a situation might involve a third party's sale of optimized packages as additions to an existing insurance product. An insurance carrier has sold the existing insurance product to a consumer, who has then gone to a third party from which the consumer may obtain the optimized packages. The optimized packages, however, may be created or selected consistent with the principles of the present invention.

Figure 3:
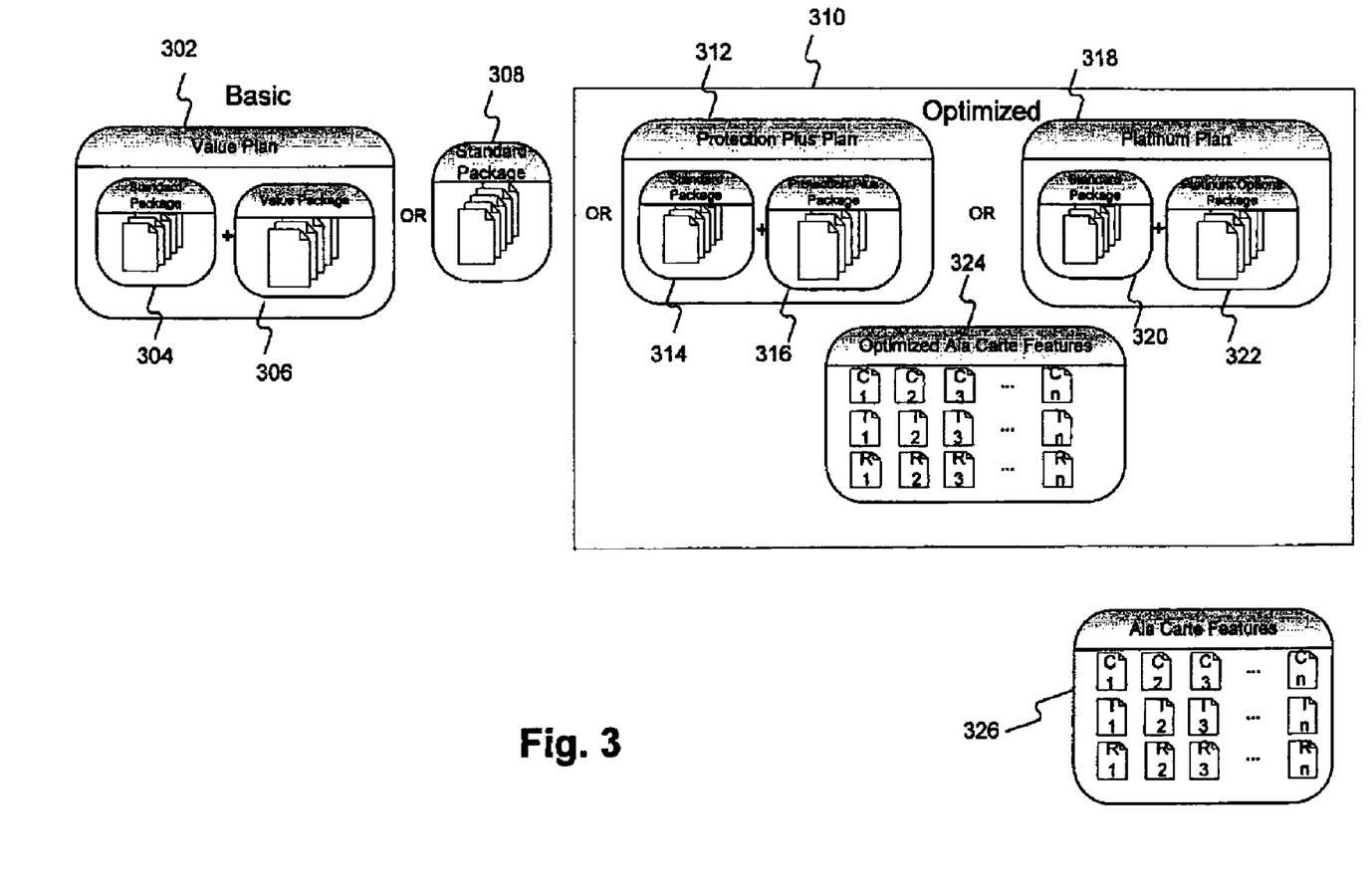
FIG. 3 is an exemplary method of offering insurance, in accordance with an embodiment of the invention.

FIG. 3 is an exemplary method of selling insurance, in accordance with an embodiment of the present invention. As shown in FIG. 3, a consumer is offered a variety of options. For example, a consumer may only want to purchase a basic insurance product. That consumer may select a standard package 308. Alternatively, the consumer may select a value plan 302, which includes a standard package 304 and a value package 306 with additional features.

However, if a consumer would like to purchase more than a basic insurance product, the consumer may select from optimized package group 310. FIG. 3 includes two exemplary optimized packages: a protection plus plan 312 and a platinum plan 318. Protection plus plan 312 includes a standard package 314 and a protection plus package 316. Protection plus package 316 may include features such as a repair/replace feature and a loan/lease-gap coverage feature. Alternatively, the consumer may select platinum plan 318, which includes a standard package 320 and a platinum options package 322. Platinum options package 322 may include features such as a repair/replace feature, a loan/lease-gap coverage feature, a monetary death indemnity feature, and a full roadside assistance feature.

In addition, the consumer may select from optimized ala carte features 324. Optimized ala carte features 324 are individual features sold separately as add-ons to certain optimized packages. Optimized ala carte features 324 have been keyed as a group to share an attribute. In addition, the consumer may also select from a general group of ala carte features 326 that have not been optimized. As shown in FIG. 3, there are many possible combinations and variations from which a consumer may select to form an insurance product.

Figure 4:
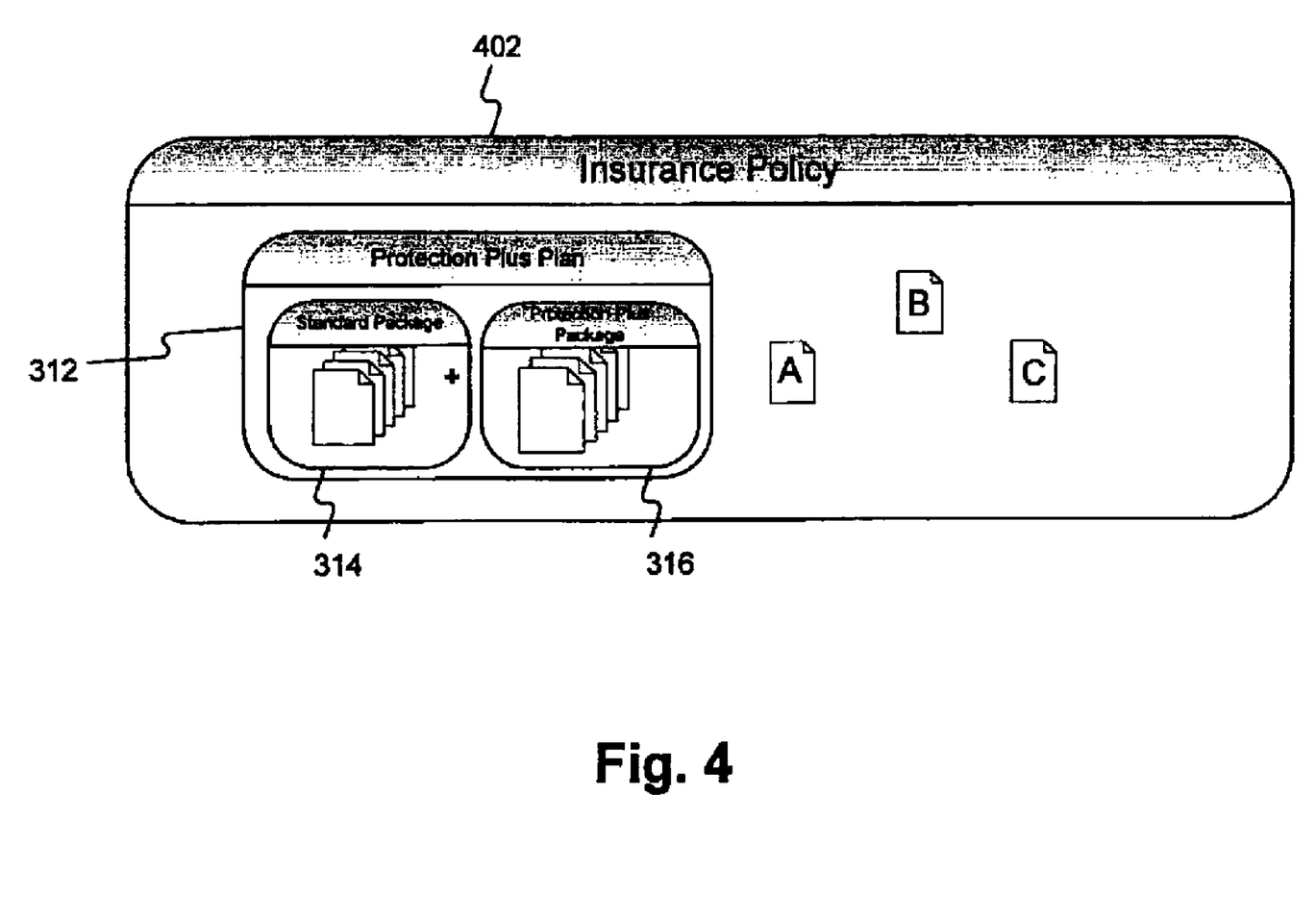
FIG. 4 shows an exemplary insurance product comprising packages selected from FIG. 3, in accordance with an embodiment of the invention.

FIG. 4 shows an exemplary insurance product comprising packages selected from FIG. 3. The example shown in FIG. 4 displays a possible selection that a consumer may make from the options provided in FIG. 3 to form insurance product 402. Insurance product 402 includes protection plus plan 312, which includes standard package 314 and protection plus package 316. In addition, insurance product 402 includes several ala carte features labeled A, B, and C, which may or may not be optimized.

Figure 5:
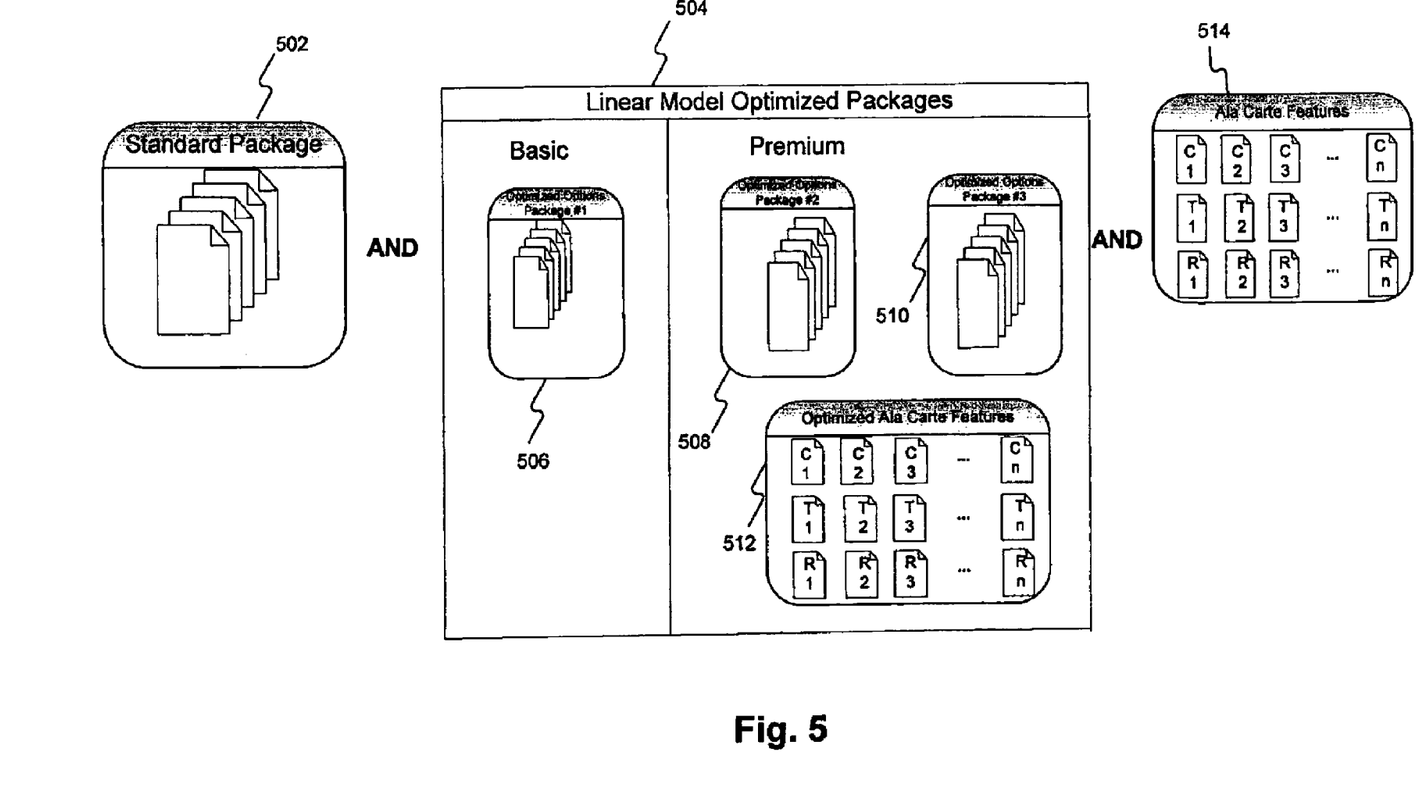
FIG. 5 is another exemplary method of offering insurance, in accordance with an embodiment of the invention.

FIG. 5 is another exemplary method of selling insurance in accordance with an embodiment of the invention. In the method shown in FIG. 5, a consumer combines packages in a linear fashion to form an insurance product. For example, the consumer selects a standard package 502. Since standard package 502 meets the minimum requirements for an insurance product, the consumer may decide only to purchase standard package 502. However, the consumer may also decide to select additional optimized packages from optimized package group 504. For example, the consumer may also select optimized options package 506, which is considered a "basic" optimized package. In addition, however, the consumer may also select optimized options package 508 and/or optimized options package 510. These additional optimized packages are considered "premium" packages because they offer additional features at a cost greater than the basic optimized package. Furthermore, optimized packages 506-510 may include features optimized in a manner consistent with the present invention. In some embodiments, a consumer may be required to first select, for example, a particular optimized options package before the consumer may select a further optimized package. Such a "tiered" arrangement requires the purchase of an initial optimized package as a prerequisite before additional optimized packages may be purchased.

Once the consumer has selected optimized options package 508 or optimized options package 510, the consumer may also select any one or more optimized ala carte features 512. Additionally, a consumer that has selected any one of optimized options packages 506-510 may also select one or more ala carte features 514. As shown in FIG. 5, there are many possible combinations and variations from which a consumer may select to form an insurance product.

Figure 6:
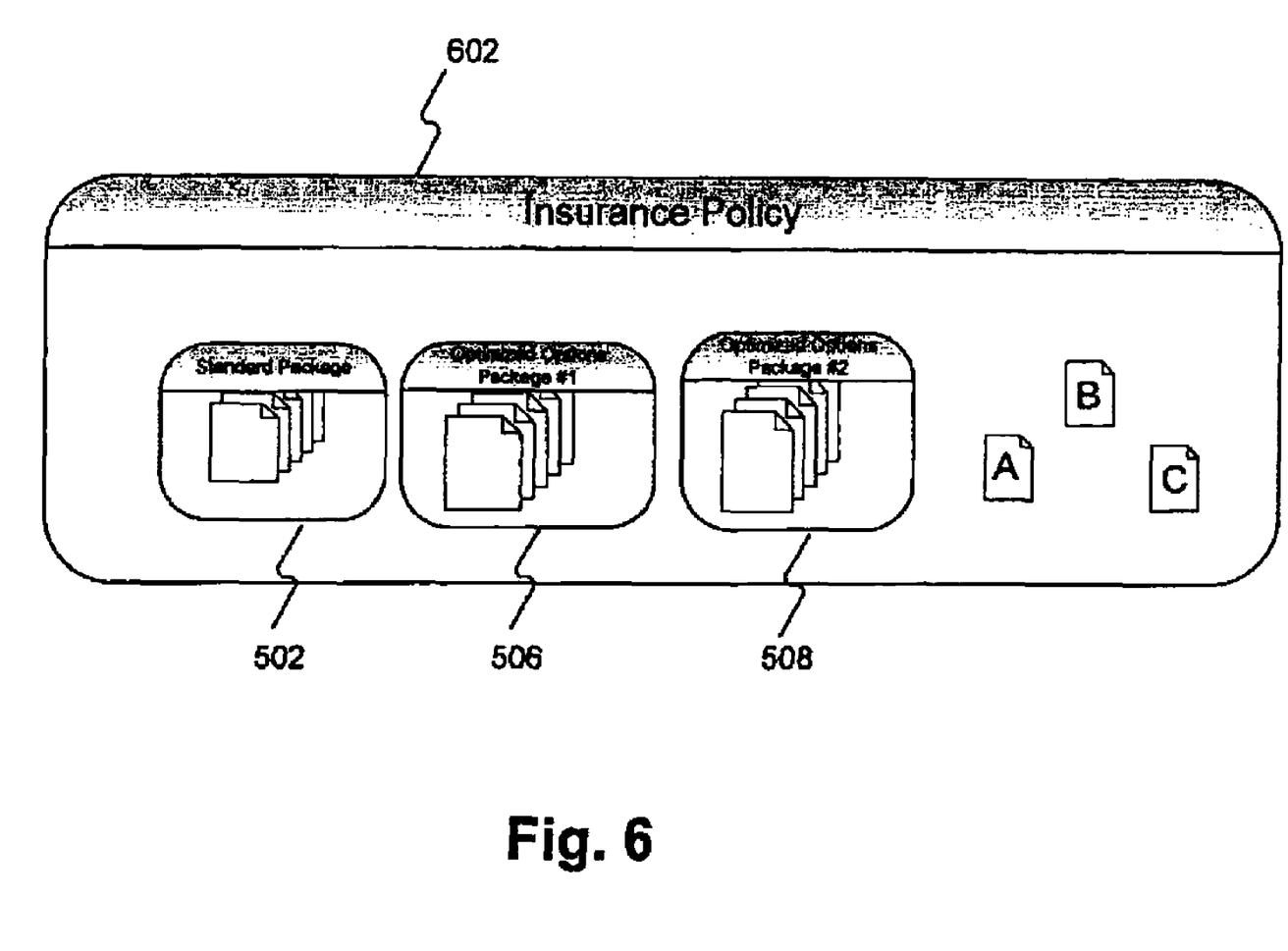
FIG. 6 shows an exemplary insurance product comprising packages selected from FIG. 5.

FIG. 6 shows an exemplary insurance product comprising packages from FIG. 5. The example in FIG. 5 shows a possible selection that a consumer may make to form insurance product 602. Insurance product 602 includes standard package 502, optimized package 506, and optimized package 508. In addition, insurance product 602 includes several ala carte features A, B, and C, which may or may not be optimized.

Figure 6A:
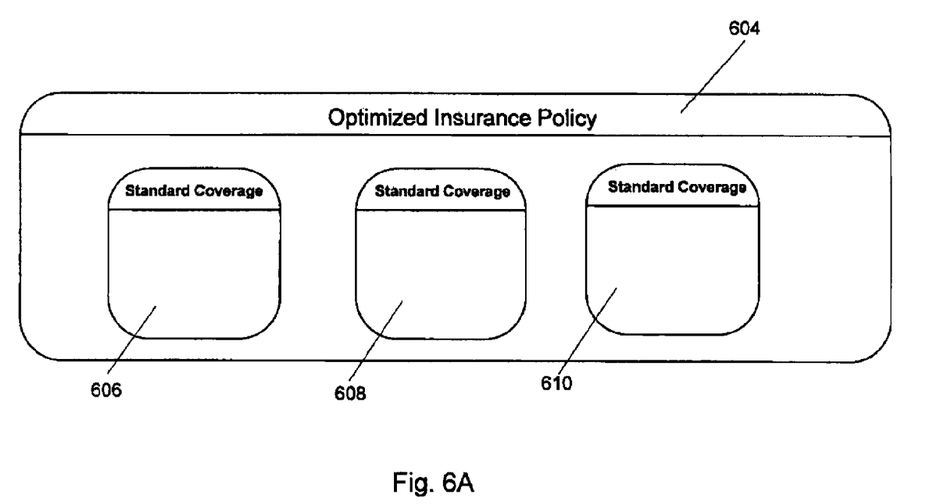
FIG. 6A shows an optimized insurance policy that includes a combination of standard coverage components, in accordance with an embodiment of the invention.
Figure 6B:
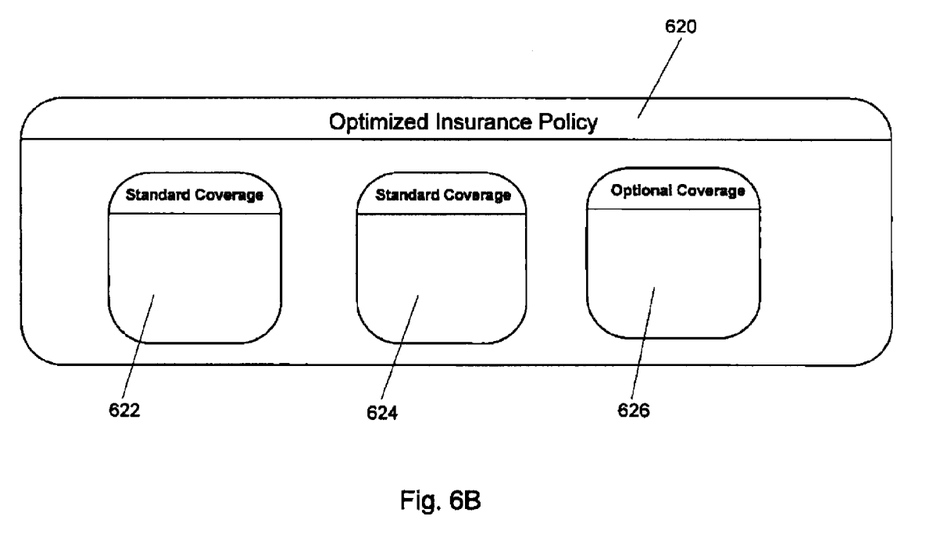
FIG. 6B shows an exemplary optimized insurance policy that includes standard coverage components and an optional coverage component, in accordance with an embodiment of the invention.

Those skilled in the art will appreciate that aspects of the invention may be applied to create a variety of different insurance products. The insurance products may include combinations of optimized components, optimized combinations of standard components and combinations of both. FIG. 6A, for example, shows an optimized insurance policy 604 that includes a combination of standard coverage components 606, 608 and 610. In one implementation, optimized insurance policy 604 is a homeowner's insurance policy. FIG. 6B illustrates an exemplary optimized insurance policy 620 that includes standard coverage components 622 and 624 and an optional coverage component 626. Optional coverage component 626 may include a grouping of insurance features that share a common attribute.

Figure 7:
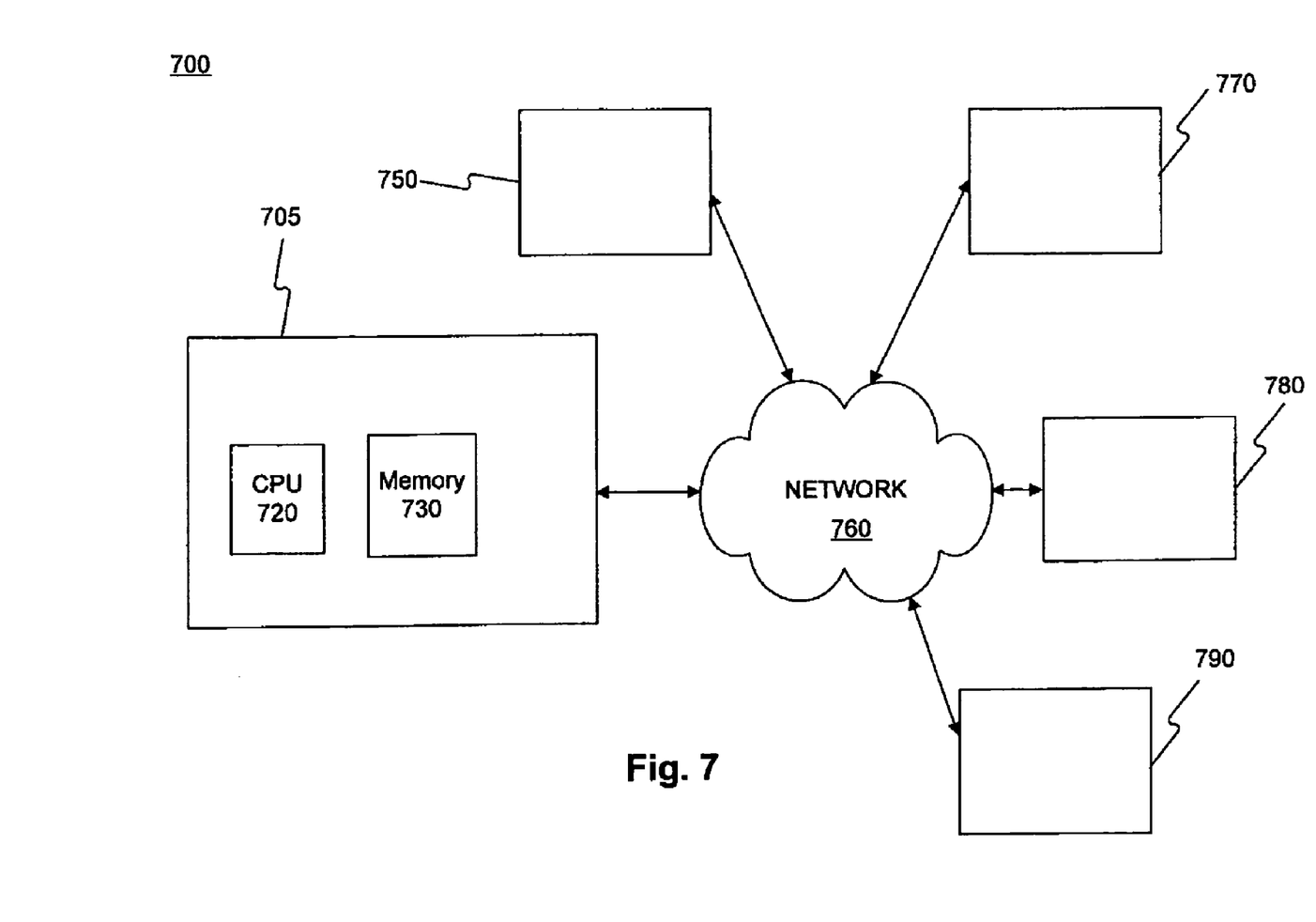
FIG. 7 is an exemplary system, in accordance with an embodiment of the invention.

FIG. 7 illustrates a system 700 that may be used to implement at least some of the methods described above, in accordance with an embodiment of the present invention. System 700 includes a server 705, connected to a network 760, including a CPU 720 and a memory 730. Software loaded into memory 730 from, for example, a disk drive (not shown) at the direction of CPU 720 may be used to implement a program for optimizing insurance in a manner consistent with various embodiments of the present invention. For example, the software may execute instructions for performing demand simulation to analyze data and to form optimized packages. In addition, memory 730 may store, for example, a database (not shown) of market data and store research conducted to design packages.

Additionally, network 760 provides communications between the various entities in system 500, such as user terminals 770-790. Network 760 may be a shared, public, or private network and encompass a wide area or local area. Further, network 760 may be implemented through any suitable combination of wired and/or wireless communication networks. By way of example, network 760 may be implemented through a wide area network (WAN), local area network (LAN), an intranet, or the Internet.

Terminals 770-790 allow a user to exchange information with server 760. Terminals 770-790 may be any type of appropriate device for communicating with server 705 over network 760. For example, terminal 770 may be a PDA running a program for communicating with server 705, while terminal 780 may be a desktop type computer running a web browser for communicating with sever 705 via the Internet. Terminal 790 may be a standard landline telephone or wireless phone.

Users may access server 705 via network 760 to customize an automobile insurance product through a web browser running on, for example, terminal 780. A website may include options to provide information or to fill out an application, and may present the user with a series of screens prompting the user to make various selections. The user may make appropriate selections to customize the insurance product. Additionally, a user at terminal 790, a telephone, may contact a consumer service representative at terminal 750. The consumer service representative may assist a consumer through a process that the customer can use to consider options for customizing an insurance product by asking a series of questions. During the process, the consumer service representative may use software running on terminal 750, and may send data to and from server 705.

Aspects of the invention may be used in connection with automobile insurance, homeowner's insurance and other types of insurance. One of skill in the art will readily recognize how to adapt the methodology described above to a variety of areas of insurance. For example, consistent with aspects of the present invention, an insurance carrier may expand its homeowner's insurance offerings to consumers by identifying features with appeal and profitability to design packages of related features at different pricing points. Customizable homeowner's insurance may include a standard package of typical coverages, and a consumer may further select optimized packages of features in a manner similar to that discussed above.

A homeowner's insurance product typically covers a building or structures on the premises and household personal property. A typical homeowner's insurance product usually also includes certain personal liability coverage and coverage for medical payments to others. Additional coverages or features are purchased ala carte.

Homeowner's insurance consistent with aspects of the present invention provides optional coverages that reflect different lifestyles and life stage needs. In particular, by implementing a methodology consistent with that described above, one may also create optimized homeowner packages. Optimized solutions may include coverages that are popular with most homeowners, as well as optimized coverages, that align with the wants and needs of a given consumer. Consumers may be offered optimized packages of coverages and terms that share a common attribute. Common attributes may relate to electronic data recovery, home enterprises, identity restoration, music & photography, prized possessions, jewelry, sports & leisure, yard & garden or other areas that present particular liability concerns to at least a group of consumers.

Optional insurance component 626 (shown in FIG. 6B) may include a grouping of insurance features that share a common attribute, such as one of the attributes described above. An electronic data recovery component may provide reimbursement for expenses incurred from an attempt to restore lost data resulting from a covered loss or computer virus. The coverage may have a limit, such as $5,000. A home enterprise coverage component may bundle increased limits for consumers who work from their home in an office/studio setting and desire additional protection for business property, liability, and/or office/studio equipment and furniture. In one embodiment of the invention, a home enterprise coverage component includes the features of an electronic data recovery component. An identity restoration component may reimburse consumers for lost wages and other covered expenses resulting from identity theft. The coverage may have a limit, such as $25,000 and may have no deductible. A music & photography component may include a bundle of increased limits for consumers who have musical instruments and photography equipment. A prized possessions component may include a bundle of increased coverage limits for consumers who have acquired certain types of assets, such as silverware, jewelry, furs, etc. A sports & leisure component may include a bundle of increased limits for consumers who have sports equipment and/or small watercraft.

A yard & garden component may include a bundle of increased limits for trees, shrubs, landscaping and other plants. The bundle may include coverage for motorized land vehicles used to service the residence premises. An increased limit, such as 10% or $1,000 per tree, may be included for replacement and debris removal of trees for certain perils. In certain embodiments increased debris removal coverage may be included in the bundle for the perils such as windstorm, hail, weight of ice, snow and sleet.

One of skill in the art will appreciate that aspects of the invention may be used to create insurance coverage packages that include standard homeowner's coverage components and at least one homeowner's component having a grouping of insurance features that share other common attributes. Exemplary common attributes may relate to home value protection, identity theft, blanket protection of valuables, limited personal umbrella policy coverage and any other attributes or combination of attributes that are desired by at least a group of consumers.

Figure 8:
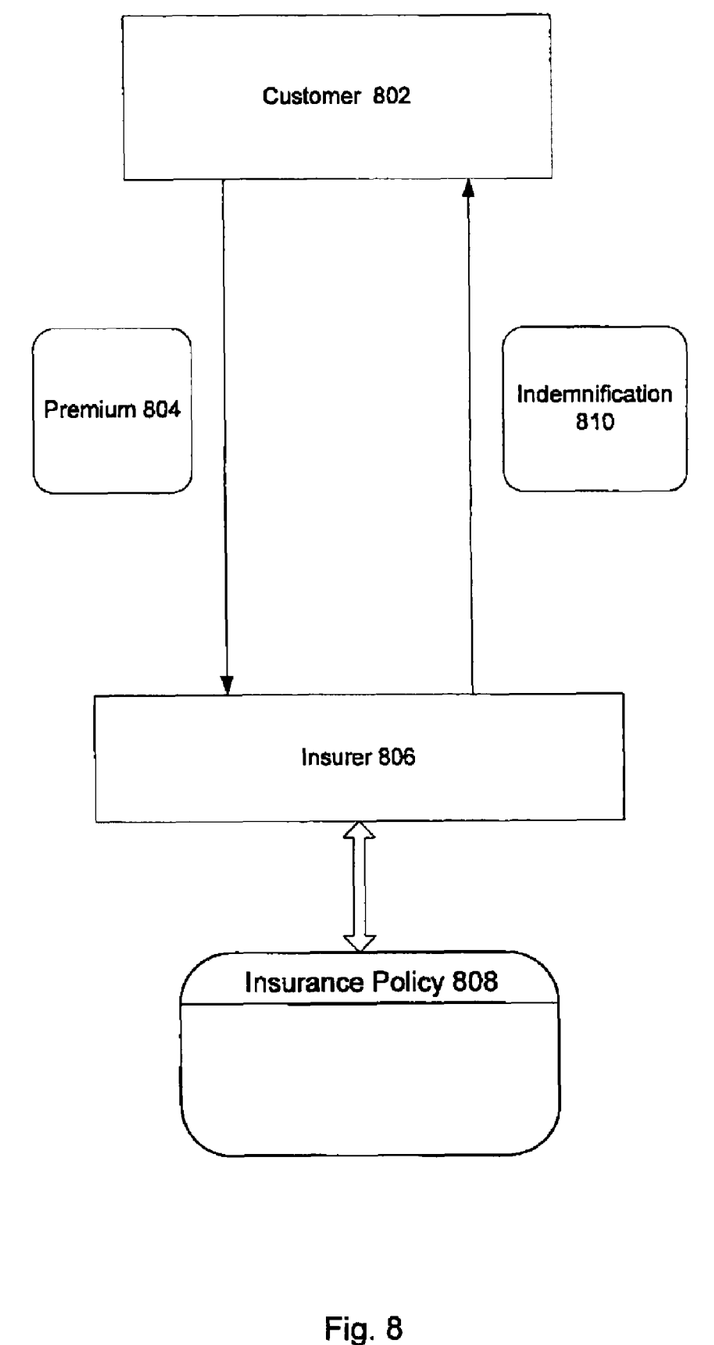
FIG. 8 illustrates a process of providing insurance coverage that may be used in connection with various embodiments of the invention.

FIG. 8 illustrates a process of providing insurance coverage that may be used in connection with the embodiments of the invention described herein. A customer 802 pays a premium 804 to an insurer 806. The premium is provided in exchange for insurance coverage described in an insurance policy 808. Insurer 806 provides indemnification 810 to customer 802 when an event covered by insurance policy 808 occurs.

Personal automobile and homeowners insurance are examples of property and casualty insurance offerings. One skilled in the art will recognize that the above-described methodology is applicable to other types of insurance products as well, such as commercial insurance for business customers. In addition, an insurance carrier may offer annuity products to consumers for retirement or financial planning purposes by identifying features with appeal and profitability to design packages of related features at different pricing points or expense levels. Customizable annuity products may include a standard annuity with typical accumulation, return, and payout features. A consumer may further select enhanced packages of features in a manner similar to that discussed above for automobile insurance.

Additional embodiments of the present invention are possible, each designed to cover other classes of insurable risk, including but not limited to, mortality risk and life insurance products; morbidity risk and health and long-term care insurance products; as well as professional practice risk and liability insurance.

Although not common in today's marketplace, it is possible to apply the disclosed methodology to so-called hybrid or multi-risk products that combine the coverages of two or more products from different classes of insurance risk into a single product. Customizable hybrid products may include a standard package across two or more risk classes with typical features in each class and a consumer may further select enhanced packages of features in a manner similar to that discussed above for automobile insurance.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method of providing insurance coverage, the method comprising:
   (a) receiving at a computer device from an insured a premium for an automobile insurance policy that includes at least one optional feature that provides a reward;
   (b) determining at the computer device when an event is covered by the automobile insurance policy; and
   wherein one of the at least one optional feature provides that:
   upon enrollment the insured will be granted a deductible reduction amount to be applied to at least one deductible during the automobile insurance policy period; and
   when no rate affecting accidents are assigned to the automobile insurance policy during an experience period, then granting an additional deductible reduction amount to be applied to at least one deductible during a subsequent automobile insurance policy period.

2. The method of claim 1, wherein one of the at least one optional feature affects the premium.

3. The method of claim 1, wherein one of the at least one optional feature affects at least one future premium upon renewal.

4. The method of claim 1, wherein one of the at least one optional feature provides that the insured will receive a credit for the absence of rate affecting accidents assigned to the automobile insurance policy within a predetermined time period.

5. The method of claim 4, wherein the credit is applied to an amount payable for a subsequent premium.

6. A method of providing insurance coverage, the method comprising:
   (a) receiving at a computer device from an insured a premium for an automobile insurance policy that includes at least one package having a grouping of insurance features that share a common attribute;
   (b) determining at a computer device when an event is covered by the automobile insurance policy; and
   wherein a feature included within the grouping of insurance features provides that:
   upon enrollment the insured will be granted a deductible reduction amount to be applied to at least one deductible during the automobile insurance policy period; and
   when no rate affecting accidents are assigned to the automobile insurance policy during an experience period, then granting an additional deductible reduction amount to be applied to at least one deductible during a subsequent automobile insurance policy period.

7. The method of claim 6, wherein a feature included within the grouping of insurance features provides that a first rate affecting accident will not impact a discount or result in an application of an accident surcharge.

8. The method of claim 7, wherein the feature that provides that a first rate affecting accident will not impact a discount or result in the application of an accident surcharge is effective upon enrollment.

9. The method of claim 7, wherein the feature further provides that a second rate affecting accident will not impact a discount or result in the application of an accident surcharge.

10. The method of claim 6, wherein a feature included within the grouping of insurance features provides that the insured will receive a credit for the absence of rate affecting accidents assigned to the automobile insurance policy within a predetermined time period.

11. The method of claim 10, wherein the credit is applied to an amount payable for a subsequent premium.

* * * * *